United States Patent
Pump et al.

(10) Patent No.: US 9,630,716 B2
(45) Date of Patent: Apr. 25, 2017

(54) CARGO RESTRAINING BARRIER, CARGO LOADING SYSTEM AND AIRCRAFT

(71) Applicant: Airbus Operations GmbH, Hamburg (DE)

(72) Inventors: Joerg Pump, Hamburg (DE); Soenke Hager, Hamburg (DE); Johannes Voelker, Hamburg (DE); Andre Koehler, Hamburg (DE); Ali Lohmann, Hamburg (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 251 days.

(21) Appl. No.: 14/620,372

(22) Filed: Feb. 12, 2015

(65) Prior Publication Data

US 2015/0225084 A1 Aug. 13, 2015

(30) Foreign Application Priority Data

Feb. 12, 2014 (EP) .................................... 14154866

(51) Int. Cl.
  *B60P 1/00* (2006.01)
  *B64D 9/00* (2006.01)
  *B60P 7/14* (2006.01)

(52) U.S. Cl.
  CPC ................ *B64D 9/003* (2013.01); *B60P 1/00* (2013.01); *B60P 7/14* (2013.01)

(58) Field of Classification Search
  CPC .............. B64D 9/003; B60P 7/14; B60P 1/00
  See application file for complete search history.

(56) References Cited

U.S. PATENT DOCUMENTS

| | | | |
|---|---|---|---|
| 3,059,593 A | 10/1962 | Mack | |
| 3,897,919 A | 8/1975 | Weingarten | |
| 6,010,286 A | 1/2000 | Cross et al. | |
| 6,568,636 B2 * | 5/2003 | Fitzgerald | B64D 9/003 108/55.1 |
| 2002/0104925 A1 | 8/2002 | Fitzgerald et al. | |
| 2004/0240959 A1 | 12/2004 | Ackerman et al. | |
| 2010/0158631 A1 | 6/2010 | Ackerman et al. | |

FOREIGN PATENT DOCUMENTS

| | | |
|---|---|---|
| EP | 2202149 | 6/2010 |
| WO | 03024792 | 3/2003 |

OTHER PUBLICATIONS

European Search Report, Jul. 16, 2014.

* cited by examiner

*Primary Examiner* — Brian M O'Hara
*Assistant Examiner* — Michael Kreiner
(74) *Attorney, Agent, or Firm* — Greer, Burns & Crain Ltd.

(57) ABSTRACT

A cargo restraining barrier configured to be mounted to a cargo deck surface of an aircraft. The cargo restraining barrier includes a base portion, a barrier portion arranged substantially perpendicular to the base portion at a first edge on the top side of the base portion, a plurality of force diverting struts mounted in parallel along the extension of the barrier portion between a backside of the barrier portion and a second edge of the base portion opposite to the first edge of the base portion. The force diverting struts are configured to divert forces acting on the front side of the barrier portion towards the base portion, and a plurality of first latches distributed over the bottom side of the base portion, hooking into tie down rings of a cargo deck surface and to direct the diverted forces from the force diverting struts into the cargo deck surface.

11 Claims, 5 Drawing Sheets

CARGO RESTRAINING BARRIER, CARGO LOADING SYSTEM AND AIRCRAFT

CROSS-REFERENCES TO RELATED APPLICATIONS

This application claims the benefit of the European patent application No. 14154866.9 filed on Feb. 12, 2014, the entire disclosures of which are incorporated herein by way of reference.

FIELD OF THE INVENTION

The present invention relates to a cargo restraining barrier for restraining a cargo item from movement across a cargo deck surface of an aircraft. The present invention further relates to a cargo loading system and an aircraft employing such a cargo restraining barrier, especially in aircraft used for aerial cargo delivery.

BACKGROUND OF THE INVENTION

Air cargo is a vital component of many international logistic networks, essential to managing and controlling the flow of goods and other resources from the source of production to the marketplace. For air cargo transportation, as well passenger aircraft and cargo aircraft are used. A passenger aircraft comprises a lower deck for the air cargo which is available under the passenger's main deck. A pure cargo aircraft (also known as freight aircraft, freighter, airlifter, or cargo jet) is an aircraft that is designed or converted for the carriage of goods, rather than for passengers. In cargo aircraft the main deck as well as the lower deck is used to carry cargo.

In modern cargo aircraft, cargo may be loaded through hinged cargo doors located in a side of the fuselage. For loading the cargo aircraft, specifically designed ULDs (unit load devices) are typically used. ULDs are containers or pallets which are used to load luggage, freight and other products into the cargo compartment of an aircraft. It allows a large quantity of cargo to be bundled into a single unit. Since this leads to fewer units to load, it saves ground crew's time and effort.

During loading, the ULDs are transferred into the fuselage through the hinged cargo door and are then maneuvered on the cargo deck which for this purpose comprises a cargo loading system. The cargo loading system typically consists of a plurality of uni- or multi-directional transfer supports to ease the passage of ULDs over the surface of the cargo deck and into a final stowed position where they are secured to the cargo deck against movements by a number of either fixed or relocatable restraints. The function of these restraints, commonly referred to as end stop devices, is to prevent movement of the cargo during operation, i.e., during takeoff, flight and landing. During operation, the ULDs are resting against these end stop means.

At the fore portion of the cargo hold of an aircraft, cargo needs to be restrained from moving forward during deceleration maneuvers of the aircraft. Such cargo restraining barriers, sometimes referred to as buffer stop assemblies, roll and lock into the forward end of an aircraft cargo hold equipped with a roller restraint cargo system. Document U.S. Pat. No. 6,568,636 B2 for example discloses a buffer stop assembly for engagement within cargo aircraft to resist cargo movement. The buffer stop assembly comprises a horizontal member selectively engageable to the aircraft and a substantially vertical member resistant to movement by aircraft cargo, which members are mounted to each other. The vertical member can be moved between an extended position and a transport position overlying the horizontal member.

Typical buffer stop assemblies, such as the one from document U.S. Pat. No. 6,568,636 B2, are movable and fixable along corresponding seat track profiles or rails which are provided in the cargo deck surface. During operation, the complete cargo within the cargo deck is typically secured by the buffer stop assembly which consequently has to take up high forces and loads. Therefore, a specific requirement of buffer stop assemblies is their capability to take very high loads without breaking. Commonly known buffer stop assemblies thus have a rather massive construction. Massive construction, however, means additional weight and costs.

SUMMARY OF THE INVENTION

Accordingly, it is an idea of the present invention to provide a simple and at the same time fail-safe cargo restraint mechanism.

According to one aspect of the present disclosure, a cargo restraining barrier is configured to be mounted to a cargo deck surface of an aircraft. The cargo restraining barrier comprises a base portion having a top side and a bottom side opposite to the top side, a barrier portion being arranged substantially perpendicular to the base portion at a first edge on the top side of the base portion, a plurality of force diverting struts being mounted in parallel along the extension of the base portion between a backside of the barrier portion and a second edge of the base portion opposite to the first edge of the base portion, the force diverting struts being configured to divert forces acting on the front side of the barrier portion towards the base portion, and a plurality of first latches distributed over the bottom side of the base portion, the first latches being configured to hook into tie down rings of a cargo deck surface and to direct the diverted forces from the force diverting struts into the cargo deck surface.

According to another aspect of the present disclosure, a cargo loading system comprises a plurality of guidance and restraint rails mounted to a cargo deck surface of an aircraft, and a cargo restraining barrier according to the present disclosure which is mounted on the plurality of guidance and restraint rails.

According to yet another aspect of the present disclosure, an aircraft comprises a cargo hold having a cargo loading system according to the present disclosure.

One idea of the present invention is to provide a stopping device that is capable of holding cargo loaded into a cargo hold of an aircraft from shifting towards the cockpit during deceleration maneuvers of the aircraft. To that end, the stopping device is equipped with an upright barrier against which the cargo is placed. When the cargo is pushing against the upright barrier, diagonally running struts divert the pushing force towards a horizontal base portion which in turn is affixed to the cargo deck surface of the cargo hold by means of latches distributed on the bottom side of the base portion. The latches may take up the diverted forces from the struts and distribute the load evenly over the bottom side of the base portion. That way, the load may be distributed efficiently and safely into the fuselage of the aircraft.

Instead of diverting the forces just to the edges of the base portion, the base portion is evenly loaded, so that high forces acting upon the upright barrier may be effectively absorbed.

Further embodiments of the present invention are subject of the following description, referring to the drawings.

According to an embodiment of the cargo restraining barrier, the base portion may comprise a plurality of force distribution beams running from the first edge of the base portion towards the second edge of the base portion, and wherein the plurality of first latches are pivotably mounted between adjacent force distribution beams.

According to another embodiment of the cargo restraining barrier, the plurality of first latches may be angled with respect to the plane of extension of the base portion when being hooked into the tie down rings of the cargo deck surface. This enables a restraint of the cargo restraining barrier in the horizontal direction.

According to another embodiment of the cargo restraining barrier, the cargo restraining barrier may further comprise at least two forklift channels arranged on the top side of the base portion. The cargo restraining barrier is built as an integral component so that there are no loose components that might get lost during loading or unloading. Therefore, the forklift channels aid in loading and unloading the whole barrier into the cargo hold of an aircraft.

According to another embodiment of the cargo restraining barrier, the cargo restraining barrier may further comprise at least two lifting hooks mounted to the top of the barrier portion and/or at least two lifting hooks mounted to the top side of the base portion. The lifting hooks may be conveniently places for a powered crane installed in the ceiling area of the rear section of the fuselage to pick up the integral cargo restraining barrier for loading from the ground and for cross-loading.

According to another embodiment of the cargo restraining barrier, the cargo restraining barrier may further comprise a plurality of second latches arranged at the first edge on the bottom side of the base portion, the second latches being configured to hook into tie down rings of the cargo deck surface and to secure the cargo restraining barrier on the cargo deck surface against tilting over around the second edge of the base portion as the tilting axis. The second latches secure the cargo restraining barrier firmly on the cargo deck surface and prevent the base portion from being lifted from the cargo deck surface when torsional forces act upon the upright barrier portion.

According to another embodiment of the cargo restraining barrier, the cargo restraining barrier may further comprise a plurality of seat rail tracks mounted to the top side of the base portion. The seat rail tracks may be conveniently provided for other loose parts of the cargo loading system to be stowed on the cargo restraining barrier.

According to an embodiment of the cargo loading system, the guidance and restraint rails may comprise a plurality of tie down rings to which the plurality of first latches are hooked. The cargo restraining barrier may be considered as a conventional cargo item during logistic transport conditions of the aircraft, i.e., when no further cargo is transported. In that case, the cargo restraining barrier is designed as a standard cargo item with respective mounting and restraining possibilities on the cargo deck surface.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

Figure 1:
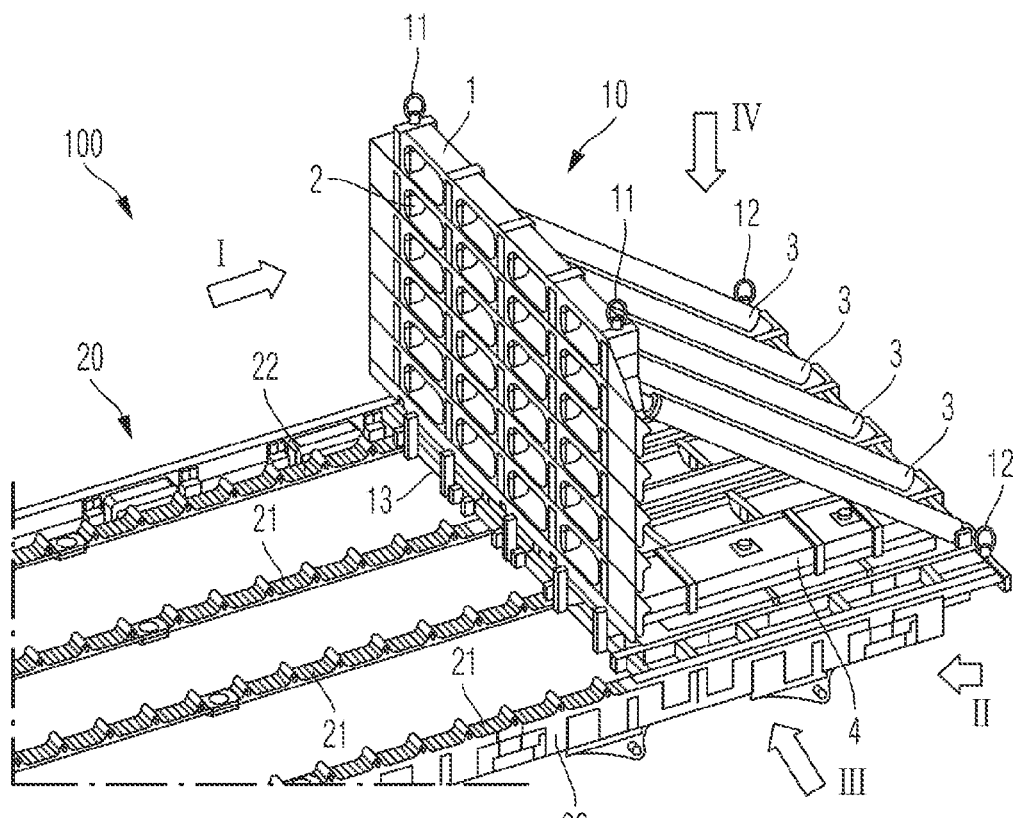
FIG. 1 schematically illustrates a perspective view of a cargo restraining barrier according to an embodiment.

Skilled artisans will appreciate that elements in the figures are illustrated for simplicity and clarity and have not necessarily been drawn to scale. For example, the chosen elements are only used to help to improve the understanding of the functionality and the arrangements of these elements in various embodiments of the present invention. Also, common but well understood elements that are useful or necessary in a commercial feasible embodiment are mostly not depicted in order to facilitate a less abstracted view of these various embodiments of the present invention. It will also be understood that the terms and expressions used in the present specification have the ordinary meaning as it accorded to such terms and expressions with respect to their corresponding respective areas of inquiry and study except where specific meanings have otherwise be set forth herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Aerial delivery of supplies to a ground based area may be effected by utilizing a container delivery system (CDS). An aircraft configured for CDS includes an aerial delivery rail system in the floor of the cargo hold that usually comprises two or more parallel rails running fore to aft and equipped with parallel rows of fore to aft rollers. Between rows of rails a center channel may be included. The rails, rollers and optionally the center channel extend from a door in the aft section of the aircraft toward the front.

The supplies to be delivered aerially are enclosed within containers or tightly packed nets. Each container (or package) is equipped with a folded parachute canopy. The container and canopy are attached to a pallet or skidboard. Each pallet with attached container and canopy is loaded into the aircraft and slid forward on the rollers. The first containers—depending on the width of the containers—move forward to contact a cargo restraining barrier at the fore portion of the cargo hold. Subsequently loaded containers move forward to contact the preceding containers in their respective loading row. Each container is firmly secured to the aircraft to prevent shifting during flight in either vertical direction (z-direction) or horizontally along the cargo deck (x-direction: from fore to aft; y-direction: perpendicular to the x-direction on the cargo deck).

During use, the aircraft is directed to the desired drop-off point, where the aircraft aft section door is opened and each individual container restraint is unlocked. The pallets and containers leave the cargo hold without usage of extraction parachutes, that is, gravity forces alone are able to effect aft movement of the pallets and containers along the rails to exit through the aft section door. Usually, the exiting of the containers and pallets is aided by an ascending aircraft maneuver to raise the nose portion of the aircraft with respect to the tail portion. Once outside the aircraft, the canopies deploy and the pallets and containers descend safely to the ground.

Due to the high weight of the containers and the respectively loaded number of containers (sometimes up to and more than 24 pallets with equipment stacked in two rows with twelve pallets each), the cargo restraining barrier at the fore portion of the cargo hold needs to prevent the whole cargo load from shifting forward during flight to prevent damage to the aircraft and injury to the flight crew. It should be noted that the cargo restraining barrier should be capable of preventing forward movement of the entire maximum cargo load even when the cargo is under acceleration towards the cockpit of three times the force of gravity.

FIG. 1 shows a schematic illustration of a perspective view of a cargo restraining barrier 10 as part of a cargo loading system 100 as indicated at least partially in FIG. 1. The cargo restraining barrier 10 is configured to restrain a ULD or rows of ULDs (not shown in FIG. 1) from movement across a cargo deck surface of an aircraft, specifically in the fore to aft direction of the aircraft in a deceleration maneuver.

The cargo deck surface 20 is indicated as including cargo loading devices and aids having a plurality of guiding and fastening rails 21, wherein in the example shown in FIG. 1 only four of them are shown. The guiding and fastening rails 21 may comprise roller tracks with rollers and/or power drive units (PDUs) to guide and propel cargo loaded onto the cargo deck surface within the interior of the cargo hold. Intermittently, the guiding and fastening rails 21 may comprise mounting areas including an opening and a corresponding tie down ring to safely fasten ULDs to the aircraft fuselage. The opening may extend below the cargo deck surface, with the tie down ring being irremovably mounted to the fuselage at a bottom surface of the opening. The tie down rings may be mounted in a pivoting fashion such that the tie down rings may be moved from an extended position to a stowing position within the rails 21.

The cargo deck surface 20 may further comprise guidance and restraint systems 22 including locking units at the edge or side portions of the cargo hold where cargo items may be secured. The locking units may in particular by so-called "x-locks" that secure cargo individually from movement in x-direction.

The cargo restraining barrier 10 is configured to be mounted to the cargo deck surface 20, i.e., the guiding and fastening rails 21, in a normal operational state. During a logistics transport condition, the cargo restraining barrier 10 may also be secured by means of the locking units of the guidance and restraint systems 22.

The cargo restraining barrier 10 comprises a base portion 4 having a top side and a bottom side opposite to the top side and a barrier portion 1 which is arranged substantially perpendicular to the base portion 4 at a first edge on the top side of the base portion 4, the first edge being the aft edge side of the base portion 4 with respect to the cargo hold of the aircraft. The barrier portion 1 may comprise a pattern of cutouts 2 or chambers, such that the barrier portion 1 takes the shape of a punched or perforated plate. The size, number and arrangement of the cutouts 2 may be selected depending on the trade-off between mechanical stability of the barrier portion 1 and the weight of the barrier portion 1.

A plurality of force diverting struts 3 are mounted in parallel along the extension of the base portion 1 between a backside of the barrier portion 1 and a second edge of the base portion 4 opposite to the first edge of the base portion 4. The force diverting struts 3 may be fixedly connected to the barrier portion 1 by barrier hinges 5 and fixedly connected to the base portion 4 by base hinges. FIG. 1 exemplarily shows five force diverting struts 3 that are spaced apart equally, however, any number of force diverting struts 3 higher or lower than five may as well be feasible, again depending on the trade-off between mechanical stability and system weight of the cargo restraining barrier 10.

Figure 2:
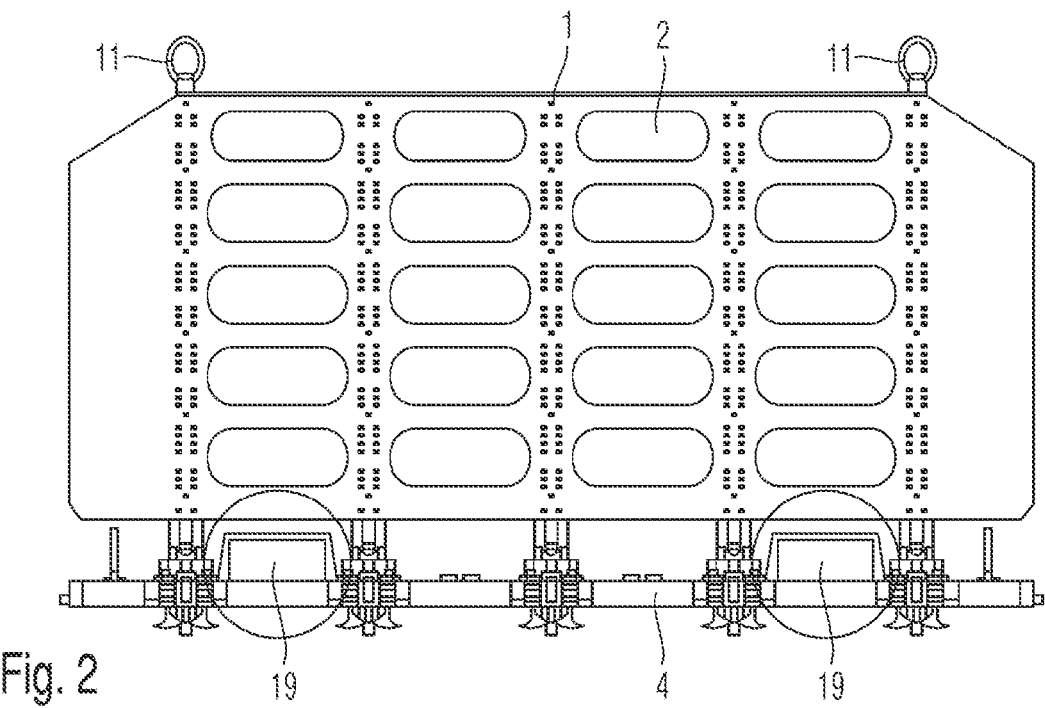
FIG. 2 schematically illustrates a front view I of the cargo restraining barrier of FIG. 1 according to an embodiment.

The force diverting struts 3 are configured to divert forces acting on the front side of the barrier portion 1, i.e., in the direction of arrow {I} towards the base portion 4. FIG. 2 schematically illustrates the front view of the cargo restraining barrier 10 in the direction of arrow {I} in greater detail. At least two forklift channels 19 are arranged on the top side of the base portion 4 for a forklift to lift the integral cargo restraining barrier 10. At least two lifting hooks 11 are mounted to the top of the barrier portion 1 for lifting the cargo restraining barrier 10, for example using a crane.

Figure 3:
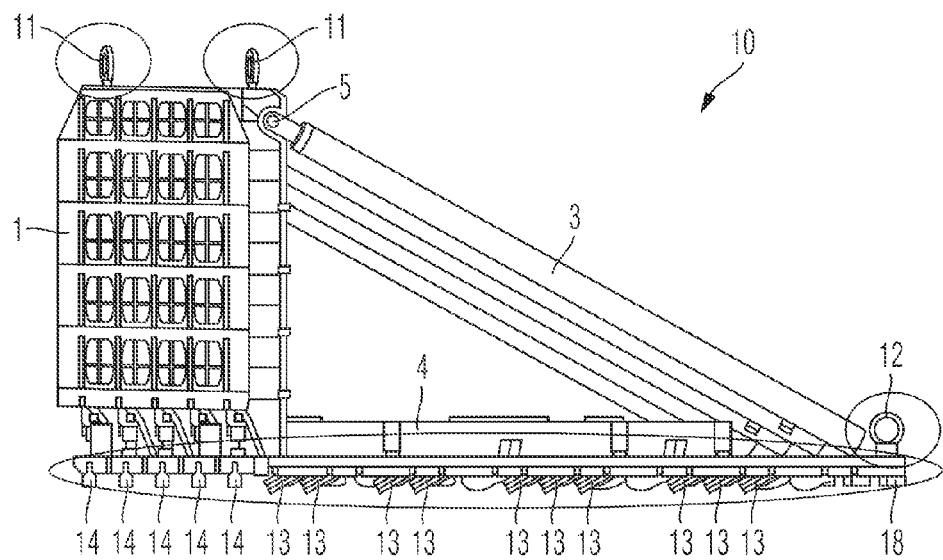
FIG. 3 schematically illustrates a side view II of the cargo restraining barrier of FIG. 1 according to an embodiment.

As shown in FIG. 3, which schematically illustrates a side view of the cargo restraining barrier 10 in the direction of arrow {II} in FIG. 1, the bottom side of the base portion 4 is equipped with a plurality of first latches 13 which are distributed over the bottom side of the base portion 4. The first latches 13 are configured to hook into tie down rings of the cargo deck surface 20 in order to direct the diverted forces from the force diverting struts 3 into the cargo deck surface 20. The first latches 13 may be referred to as "x-latches" since they prevent movement of the cargo restraining barrier in x-direction, i.e., lateral to the cargo deck surface 20 in the direction of extension of the guidance and restraint rails 21. As further shown in FIG. 3, at least two lifting hooks 12 are mounted to the top side of the base portion 4, so that a total of four lifting hooks 11 and 12 may be provided for balanced lifting of the cargo restraining barrier 10.

A plurality of second latches 14 are arranged at the first edge on the bottom side of the base portion 4. The second latches 14 are configured to hook into tie down rings of the cargo deck surface 20 as well in order to secure the cargo restraining barrier 10 on the cargo deck surface 20 against tilting over around the second edge of the base portion 4 as tilting axis. The second latches 14 may be referred to as "z-latches" since they prevent movement of the cargo restraining barrier in z-direction, i.e., perpendicular to the cargo deck surface 20.

Figure 4:
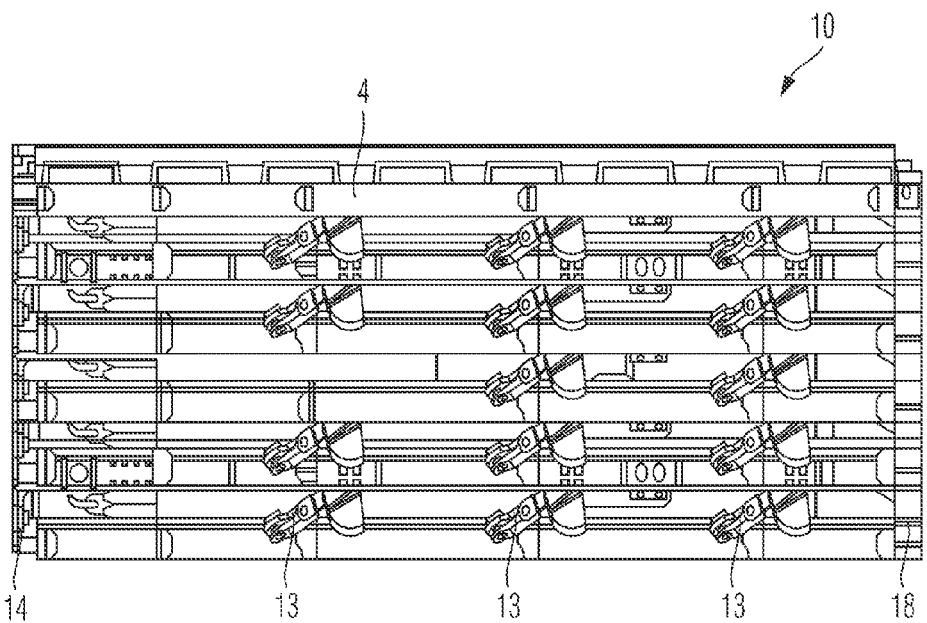
FIG. 4 schematically illustrates an isometric bottom view III of the cargo restraining barrier of FIG. 1 according to an embodiment.
Figure 6:
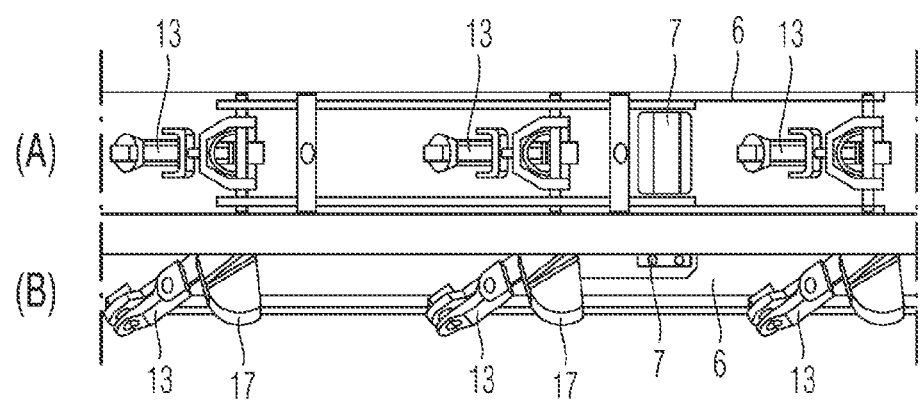
FIG. 6 schematically illustrates detailed views of the isometric bottom view III of the cargo restraining barrier of FIG. 4 according to an embodiment.

The latches 13 and 14 are visible in the illustration of FIG. 4 which schematically shows a perspective bottom view of the bottom side of the base portion 4 in the direction of arrow {III} in FIG. 1. There are 14 first latches 13 arranged in five rows which are evenly spaced out over the bottom side of the base portion 4. However, the number of first latches 13 may deviate from the exemplary number shown, and may in particular be greater or smaller than 14. Similarly, the specific arrangement of the first latches 13 may be different than exemplarily shown in FIG. 4 and the distribution may be selected differently as well. As shown in even greater detail in FIG. 6(A), the latches are hinged between a plurality of force distribution beams 6 that are running from the first edge of the base portion 4 towards the second edge of the base portion 4. The force distribution beams 6 may be connected to the base portion 4 by means of twin pins 7 as shown in FIG. 6(B). The plurality of first latches 13 are pivotably mounted between adjacent force distribution beams 6, so that they may take on an angled position with respect to the plane of extension of the base portion. In particular, the plurality of first latches 13 may be angled with respect to the plane of extension of the base portion 4 when being hooked into the into tie down rings 23 of the cargo deck surface 20, i.e., during a normal operational condition of the cargo loading system 100. With the angled coupling of the first latches 13 to the tie down rings, forces in x-direction may be efficiently coupled along the force distribution beams 6 and via the first latches 13 into the cargo deck surface 20 and thus the fuselage of the aircraft.

Figure 5:
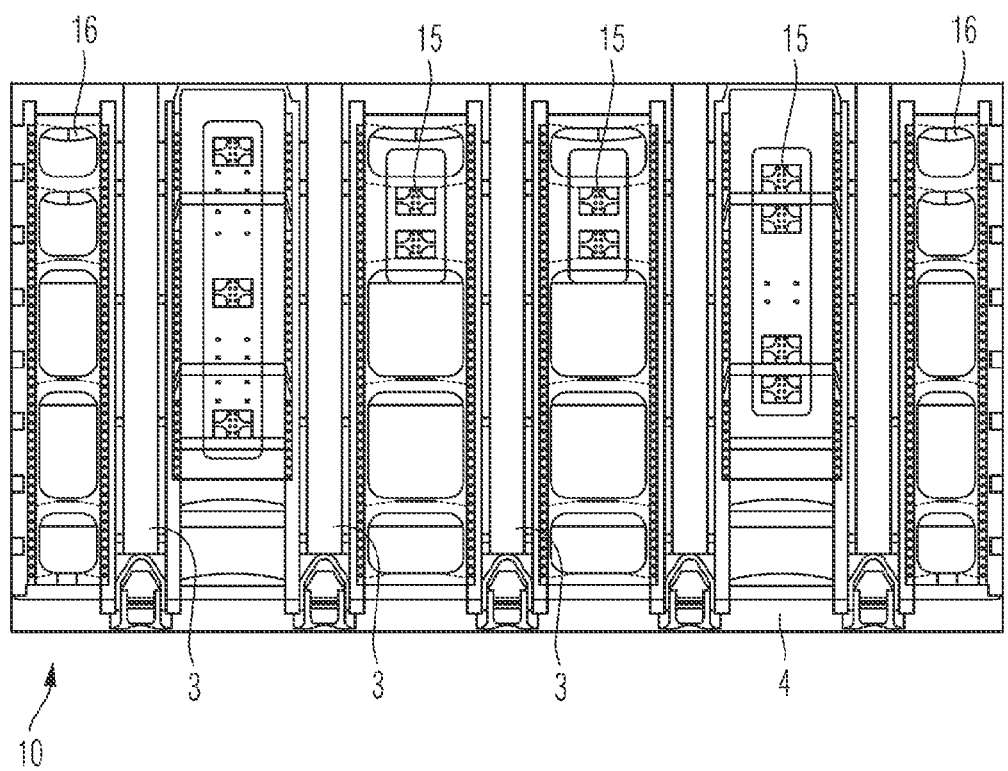
FIG. 5 schematically illustrates a top down view IV of the cargo restraining barrier of FIG. 1 according to an embodiment.

FIG. 5 schematically shows a top down view on the top side of the base portion 4 in the direction of arrow {IV} in FIG. 1. A plurality of seat rail tracks 15 are mounted to the top side of the base portion 4. The seat rail tracks 15 may be standard size tracks and may be used as stowage room for restraining assemblies, for example restraining components arranged in a center guidance and restraining channel in the middle between the center guidance and restraining rails 21. Such guidance and restraining channel may be used for cargo loading systems 100 being loaded with multiple rows of cargo containers in order to secure the containers between adjacent rows. The restraining assemblies may be safely stowed away using the seat rail tracks 15 so that no components may get lost.

At the sides of the base portion 4, notched side rails 16 may be provided to facilitate locking the cargo restraining barrier 10 to the guidance and restraining 22 of the cargo deck surface 20. This may be useful during logistic transport flights, where the cargo restraining barrier 10 does not need to fulfil its function and may be considered as yet another cargo item to be transported.

Figure 7:
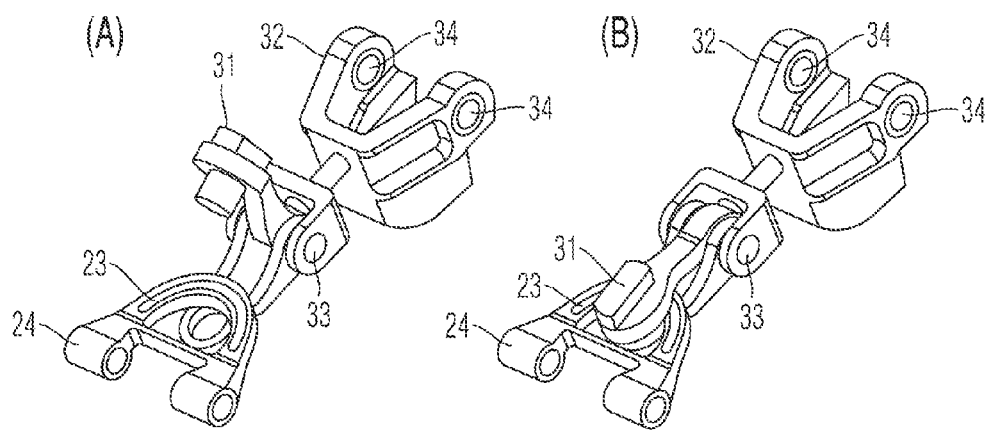
FIG. 7 schematically illustrates detailed views of operational states of latching devices of the cargo restraining barrier of FIG. 1 according to an embodiment.

FIG. 7 schematically illustrates a possible configuration for the first latches 14 and/or second latches 15. FIG. 7(A) shows an open position when the latch is ready to be locked to a tie down ring 23, whereas FIG. 7(B) shows the locking position when the latch is actually fastened to the tie down ring 23. The tie down ring 23 may comprise a ring hinge 24 used to fasten the tie down ring 23 securely to the guidance and restraint rails 21 of the cargo deck surface 20. Reference symbol 31 denotes the latch fastener of the latch which engages with the tie down ring 23 in a clasping manner. The latch fastener 31 is pivotably coupled in a fastener hinge 33, which in turn is fixed a latch main body 32. The latch main body 32 may comprise a main body hinge 34 which may be coupled between the longitudinal force distribution beams 6 using pins or similar securing means.

Figures 8, 9:
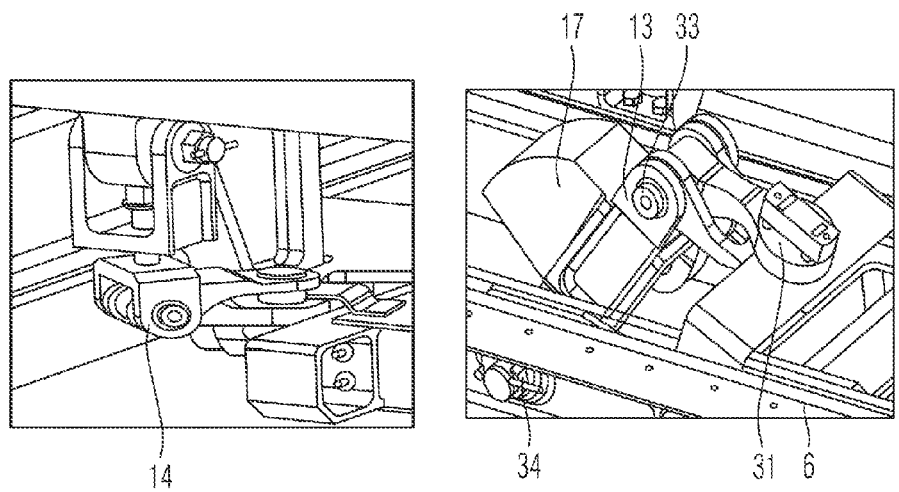
FIG. 8 schematically illustrates a latching device of a cargo restraining barrier according to an embodiment in a stowing position.
FIG. 9 schematically illustrates another latching device of a cargo restraining barrier according to an embodiment in a stowing position.

The main body hinge 34 and the fastener hinge 33 together may be used to bring the latch into a stowage position such that the latch fastener 31 does not project from the bottom side of the base portion 4. This may be particularly useful during logistic transportation flight where the cargo restraining barrier 10 is not in operational use. FIGS. 8 and 9 show exemplary view of a z-latch 14 (FIG. 8) and an x-latch 13 (FIG. 9) in their respective stowage positions.

Figure 10:
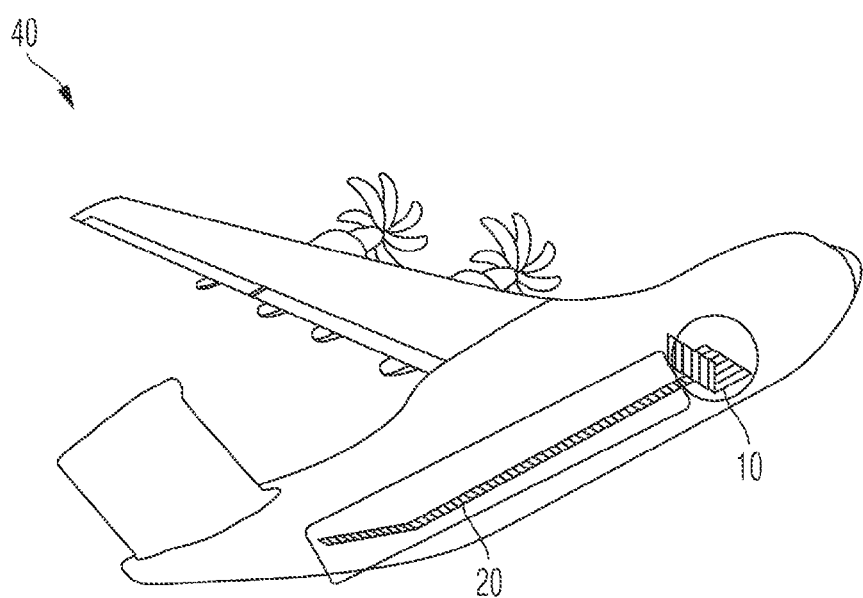
FIG. 10 schematically illustrates an aircraft having a cargo loading system according to the present disclosure.

FIG. 10 schematically illustrates an aircraft 40 according to the present invention. Particularly, FIG. 10 shows a cargo hold within the aircraft 40, the cargo hold being equipped with a cargo deck surface 20 and a corresponding cargo restraining barrier 10 at the fore end area of the cargo hold. The cargo restraining barrier 10 may be part of a cargo loading system according to the present invention in order to secure ULDs or other cargo items from lateral movement over the cargo deck surface 20. The cargo items that may be restrained by the cargo restraining barrier may include a range of military helicopters and vehicles, heavy engineering equipment, pallets and cargo containers.

The cargo restraining barriers and cargo loading systems, respectively, according to the present disclosure are suitable for any aircraft, in particular (wide body) passenger aircraft having a cargo deck, pure cargo aircraft, and helicopters. The cargo restraining barriers according to the present disclosure may also be used in other transportation means, such as railway cargo coaches, cargo ships, trucks and truck trailers and the like.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cargo restraining barrier configured to be mounted to a cargo deck surface of an aircraft, the cargo restraining barrier comprising:
   a base portion having a top side and a bottom side opposite to the top side;
   a barrier portion being arranged substantially perpendicular to the base portion at a first edge on the top side of the base portion;
   a plurality of force diverting struts being mounted in parallel along the extension of the base portion between a backside of the barrier portion and a second edge of the base portion opposite to the first edge of the base portion, the force diverting struts being configured to divert forces acting on the front side of the barrier portion towards the base portion; and a plurality of first latches distributed over the bottom side of the base portion, the first latches being configured to hook into tie down rings of a cargo deck surface and to direct the diverted forces from the force diverting struts into the cargo deck surface.

2. The cargo restraining barrier according to claim 1, wherein the base portion comprises a plurality of force distribution beams running from the first edge of the base portion towards the second edge of the base portion, and wherein the plurality of first latches are pivotably mounted between adjacent force distribution beams.

3. The cargo restraining barrier according to claim 1, wherein the plurality of first latches are angled with respect to the plane of extension of the base portion when being hooked into the into tie down rings of the cargo deck surface.

4. The cargo restraining barrier according to claim 1, further comprising at least two forklift channels arranged on the top side of the base portion.

5. The cargo restraining barrier according to claim 1, further comprising at least two lifting hooks mounted to the top of the barrier portion.

6. The cargo restraining barrier according to claim 1, further comprising at least two lifting hooks mounted to the top side of the base portion.

7. The cargo restraining barrier according to claim 1, further comprising a plurality of second latches arranged at the first edge on the bottom side of the base portion, the second latches being configured to hook into tie down rings of the cargo deck surface and to secure the cargo restraining barrier on the cargo deck surface against tilting over around the second edge of the base portion as tilting axis.

8. The cargo restraining barrier according to claim 1, further comprising a plurality of seat rail tracks mounted to the top side of the base portion.

9. A cargo loading system, comprising:
a plurality of guidance and restraint rails mounted to a cargo deck surface of an aircraft; and
a cargo restraining barrier configured to be mounted to a cargo deck surface of an aircraft, the cargo restraining barrier comprising:
a base portion having a top side and a bottom side opposite to the top side;
a barrier portion being arranged substantially perpendicular to the base portion at a first edge on the top side of the base portion;

a plurality of force diverting struts being mounted in parallel along the extension of the base portion between a backside of the barrier portion and a second edge of the base portion opposite to the first edge of the base portion, the force diverting struts being configured to divert forces acting on the front side of the barrier portion towards the base portion; and a plurality of first latches distributed over the bottom side of the base portion, the first latches being configured to hook into tie down rings of a cargo deck surface and to direct the diverted forces from the force diverting struts into the cargo deck surface, the cargo restraining barrier being mounted on the plurality of guidance and restraint rails.

10. The cargo loading system according to claim 9, wherein the guidance and restraint rails comprise a plurality of tie down rings to which the plurality of first latches are hooked.

11. An aircraft, comprising a cargo hold having a cargo loading system, the cargo loading system comprising:
a plurality of guidance and restraint rails mounted to a cargo deck surface of an aircraft; and
a cargo restraining barrier configured to be mounted to a cargo deck surface of an aircraft, the cargo restraining barrier comprising:
a base portion having a top side and a bottom side opposite to the top side;
a barrier portion being arranged substantially perpendicular to the base portion at a first edge on the top side of the base portion;
a plurality of force diverting struts being mounted in parallel along the extension of the base portion between a backside of the barrier portion and a second edge of the base portion opposite to the first edge of the base portion, the force diverting struts being configured to divert forces acting on the front side of the barrier portion towards the base portion; and
a plurality of first latches distributed over the bottom side of the base portion, the first latches being configured to hook into tie down rings of a cargo deck surface and to direct the diverted forces from the force diverting struts into the cargo deck surface
the cargo restraining barrier being mounted on the plurality of guidance and restraint rails.

* * * * *